Sept. 30, 1969     R. V. ROSS     3,469,284
CHAIN-MAKING APPARATUS
Filed Jan. 11, 1967                      2 Sheets-Sheet 1
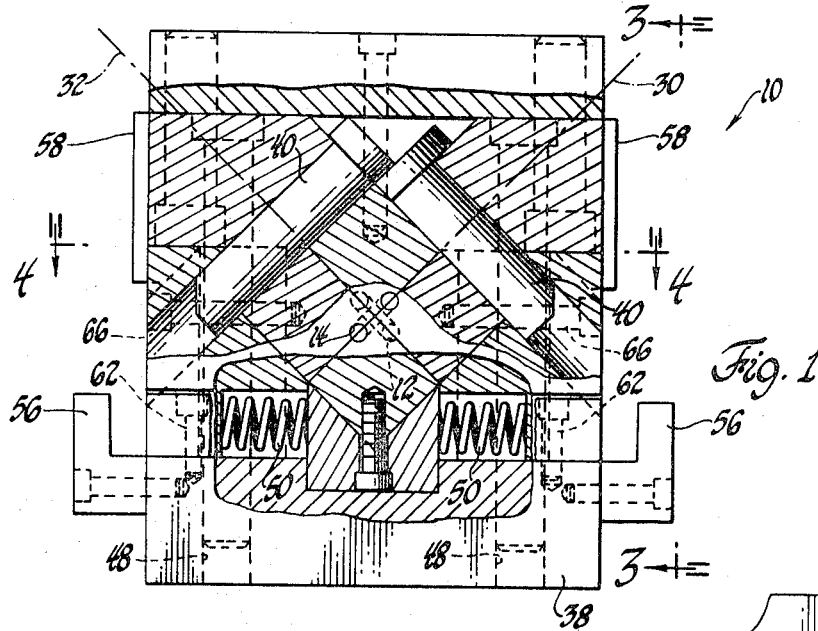
Fig. 1
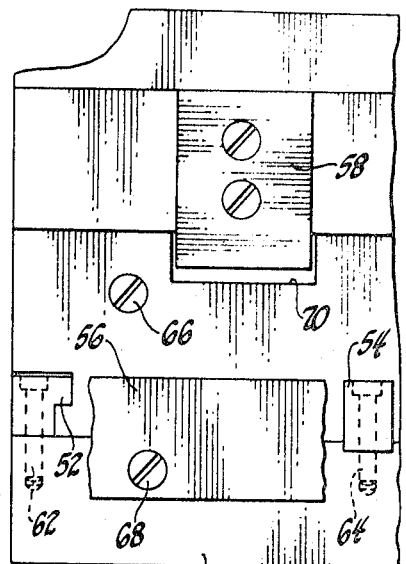
Fig. 3
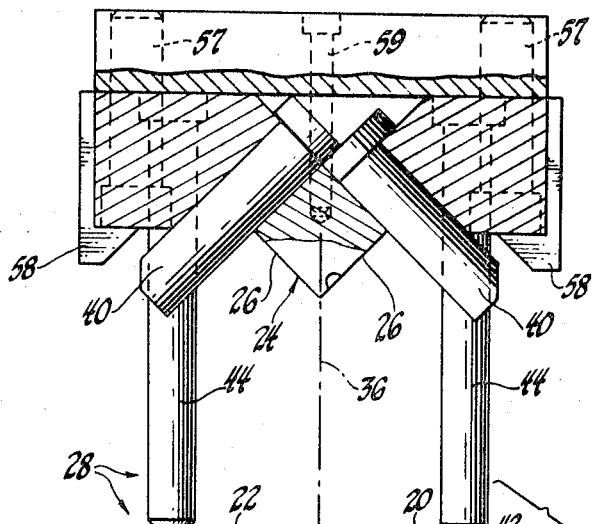
Fig. 2
INVENTOR.
Robert V. Ross
BY
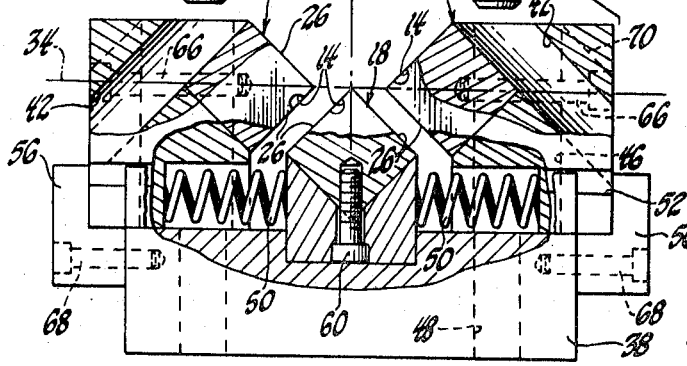
ATTORNEYS

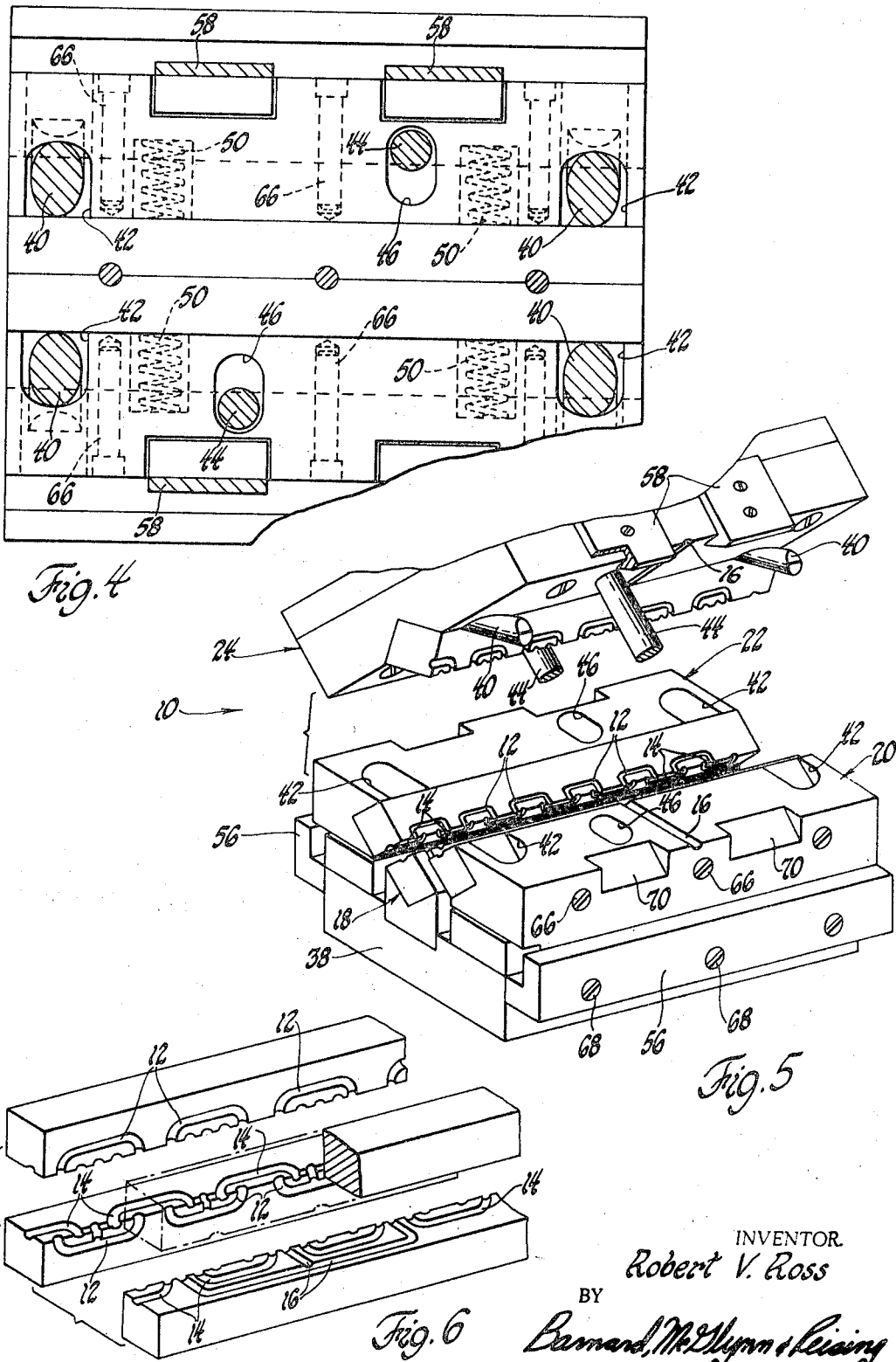

3,469,284
CHAIN-MAKING APPARATUS
Robert V. Ross, 1641 Wordsworth St.,
Ferndale, Mich. 48220
Filed Jan. 11, 1967, Ser. No. 608,595
Int. Cl. B29c *1/00;* B22c *9/30*
U.S. Cl. 18—42                    9 Claims

ABSTRACT OF THE DISCLOSURE

A mold having a first plurality of spaced endless passages for forming alternate links of a chain and a second plurality of spaced endless passages each extending about and interlocking adjacent ones of the first plurality of endless passages to form the other alternate links of the chain, the mold being separable into four components along a first plane of separation which bisects the first plurality of endless passages and along a second plane of separation which bisects the second plurality of endless passages, the first of the components being disposed on a support platform with second and third of the components being slidably disposed on the support platform for movement into and out of engagement with the first component and the fourth component being movable into and out of engagement with the other components, the components being oriented so that they simultaneously move relative to one another along two lines which are disposed at right angles with one another and which are 45° from the two planes of separation.

---

A prior U.S. Patent 2,051,653 discloses an apparatus for casting interlocking rings and which includes four components separable along the planes which are at 90° with one another and bisects the passages for forming the interlocking rings. In such an apparatus, however, the four components must be individually moved apart by hand and there is no means for interrelating the relative movement between the four components of the mold.

Accordingly, it is an object and feature of this invention to provide such a molding apparatus which includes positioning means controlling the relative movement between the components of the mold for simultaneously relatively moving the components toward and away from each other.

Another object and feature of this invention is to provide a molding apparatus including four components separated along respective planes which bisect the first and second plurality of passages and are disposed at a right angle to one another and including positioning means for establishing relative movement between the components along first and second lines which are at a right angle with one another and are disposed at an angle of 45° from the planes of separation of the mold and in a manner so that the relative movement between the components is simultaneous.

In general, these and other objects and features of this invention may be attained in an embodiment including a mold having a first plurality of spaced endless passages for forming alternate links of chain and a second plurality of spaced endless passages each of which extends about and interlocks adjacent ones of the first plurality of endless passages to form the other alternate links of the chain. There is included passage means extending into the mold for injecting materials into the endless passages. The mold is separable into four components along a first plane of separation which bisects the first plurality of endless passages and along a second plane of separation which bisects the second plurality of endless passages. Thus, each component has two surfaces for engaging two other components. There is also included positioning means controlling the relative movement between the components for simultaneously relatively moving the components toward and away from each other. More specifically, the positioning means includes a support platform and a first of the components is immovably disposed on the platform. A second of the components is slidably supported on the support platform for movement toward and away from the first component along a line which is disposed at an angle of 45° with the planes of separation. A third of the components is also slidably supported on the support platform, but on the other side of the first component from the second component, for movement toward and away from the first component along the first line. Guide members extend from the fourth of the components. One of the guide members is spaced and parallel to one of the planes of separation and at least one other guide member is spaced and parallel to the other plane of separation. Guide passages extend through the second and third components for receiving the guide members. The guide passages in the second component are disposed at an angle of 90° relative to the guide passages in the third component. Each guide passage is disposed parallel to at least one of the planes of separation so that upon relative movement of the first and fourth components toward one another, the guide members move into the guide passages to move the second and third components toward one another and toward the first component and so that upon relative movement of the first and fourth components away from one another, the guide members move out of the guide passages to move the second and third components away from one another and away from the first component. There is also included alignment means comprising pins for slidably interconnecting the support platform and the fourth component to guide the relative movement therebetween.

Other objects and attendant advantages of the present invention will be readily appreciated as the same becomes better understood by reference to the following detailed description when considered in connection with the accompanying drawings wherein:

FIGURE 1 is an end view partially broken away and in cross section of a preferred embodiment of the instant invention;

FIGURE 2 is an end view partially broken away and in cross section showing the preferred embodiment in the open position;

FIGURE 3 is a fragmentary view taken substantially along line 3—3 of FIGURE 1;

FIGURE 4 is a fragmentary cross-sectional view taken substantially along line 4—4 of FIGURE 1;

FIGURE 5 is a perspective fragmentary view of the preferred embodiment of the instant invention; and FIGURE 6 is a perspective exploded view partially cut away showing the four basic components of the mold apparatus of the instant invention.

Referring now to the drawings, wherein like numerals indicate like or corresponding parts throughout the several views, a chain-making apparatus constructed in accordance with the instant invention is generally shown at 10. The apparatus comprises a mold which includes a first plurality of spaced endless passages 12 for forming alternate links of a chain. The mold also includes a second plurality of spaced endless passages 14, each of which extends about and interlocks adjacent ones of the first plurality of endless passages 12 to form the other alternate links of the chain.

There is also included passage means 16 extending into the mold for injecting materials into the endless passages 12 and 14.

The mold is separable into four components, which are respectively generally indicated at 18, 20, 22 and 24.

The mold is separable into four components along a first plane of separation 32 which bisects the first plurality of endless passages 12, also along a second plane of separation 30 which bisects the second plurality of endless passages 14. Thus, each of the components 18, 20, 22 and 24 has two surfaces 26 for engaging two other components. That is to say, the component 18 has two surfaces 26 which engage like surfaces 26 on the respective components 20 and 22.

There is also included positioning means, generally indicated at 28, controlling the relative movement between the components 18, 20, 22 and 24 for simultaneously relatively moving the components toward and away from each other. As shown in FIGURE 1, the first plane of separation is indicated at 32 and the second plane of separation is indicated at 30. The first plane of separation 32 is disposed transversely and at a right angle or 90° to the second plane of separation 30. The positioning means 28 includes means for establishing the relative movement between the components 18, 20, 22 and 24 along first and second lines 34 and 36. The lines 34 and 36 are disposed transversely and at a right angle, or 90°, with one another and are disposed at an angle of 45° from the plane of separations 30 and 32, i.e., at an angle of 45° from the surfaces 26. The positioning means 28 maintains a first of the components 18 stationary and establishes movement of the second and third components 20 and 22 so that the latter move toward and away from the first component 18 and toward and away from each other along the first line 34, which is disposed at an angle of 45° with the surfaces 26 on the first component, and, in addition, establishes movement of the fourth component 24 so that the latter moves toward and away from the first component 18 and toward and away from the second and third components 20 and 22 along the second line 36, which is disposed at an angle of 135° with the surfaces 26 on the first component 18. The positioning means, therefore, defines means coacting between the fourth component 24 and the second and third components 20 and 28.

More specifically, the positioning means includes a support platform 38, guide members 40, guide passages 42, alignment means comprising the pins 44, holes 46 and 48, biasing means comprising the spring 50, tongue and groove means 52 and 54, stop means 56, and the locking members 58.

The first component 18 is immovably disposed on the support platform 38 by the bolt 60. The platform 38 as shown includes two parts which are secured together such as by a bolt (not shown) although it will be understood that the platform as well as each of the other components may be one integral member. The second component 20 is slidably supported on the support platform 38 by male and female portions comprising the tongue and groove arrangements 62 and 64 for movement toward and away from the first component 18 along the first line 34. The tongues of the tongue and groove arrangement 52 are secured to the support platform 38 by the bolts 62. In a like manner, the tongue of the tongue and groove 54 is secured to the support platform 38 by a bolt 64.

The third component 22 is also slidably supported on the support platform by male and female portions comprising the tongue and grooves 52 and 54. The third component 22 is disposed on the support platform on the other side of the first component 18 from the second component 20 for movement toward and away from the first component 18 along the first line 34. It will be noted that the second and third components 20 and 22 are formed of two parts and held together by the bolts 66 but, as mentioned above, they may be integral members.

It will be noted that the fourth component 24 is made of various parts which are held together by the bolts 57 and 59; however, it will be understood that the fourth component 24 may be an integral member. The support platform and the fourth component are to be attached to sections of a press in molding machine so as to move toward and away from one another along a line as is well known in the molding art.

The guide members 40 extend from the fourth component 24 and one of the guide members is spaced and parallel to one of the surfaces 26 on the fourth component 24 and the other guide member is spaced and parallel to the other of the surfaces 26 on the fourth component 24. The guide passages 42 extend through the second and third components 20 and 22 respectively for receiving the guide members 40. The guide passages 42 in the second component 20 are disposed at an angle of 90° relative to the guide passages 42 in the third component 22. Each guide passage 42 is disposed parallel to at least one of the surfaces 26 on the first component 18. Therefore, upon relative movement toward one another between the first and fourth components 18 and 24, the guide members 40 move into the guide passages 42 to move the second and third components 20 and 22 toward one another and toward the first component 18 so that the surfaces 26 of the respective components engage one another. In like manner, upon relative movement away from one another between the first and fourth components 18 and 24, the guide members 40 move out of the guide passages 42 to move the second and third components 20 and 22 away from one another and away from the first component 18. Thus, the relative movement between the four respective components is simultaneous.

The alignment means, which comprises the pins 44 and the passages 46 and 48, slidably interconnects the support platform 38 and the fourth component 24 to guide the relative movement therebetween along the line 36. More specifically, the pins 44 engage and are slidably disposed in the holes 48 while the holes 46 in the second and third components 20 and 22 are large enough to spacedly surround the pins 44 to allow the second and third components 20 and 22 to move along the first line 34.

The springs 50 of the biasing means urge the second and third components 20 and 22 to move away from the first component 18, thus assisting the guide members 40 in moving the second and third components 20 and 22 away from one another. There is also included the stop means 56 which is secured to the support platform 38 by the bolts 68 for limiting the movement of the second and third components 20 and 22 in a direction away from the first component 18.

The locking members 58 engage the recesses 70 in the second and third components 20 and 22 respectively for urging together and helping to maintain together the second and third components 20 and 22.

The invention has been described in an illustrative manner and it is to be understood that the terminology which has been used is intended to be in the nature of words of description rather than of limitation.

Obviously, many modifications and variations of the present invention are possible in light of the above teaching. It is, therefore, to be understood that within the scope of the appended claims, the invention may be practiced otherwise than as specifically described.

The embodiments of the invention in which an exclusive property or privilege is claimed are defined as follows:

1. An apparatus comprising: a mold of the type adapted for attachment to sections of a press in a molding machine which move relative to one another along a line toward and away from one another, said mold having a first plurality of spaced endless passages for forming alternate links of a chain and a second plurality of spaced endless passages each extending about and interlocking at least one of said first plurality of endless passages to form the other alternate links of said chain, passage means extending into said mold for injecting materials into said endless passages, said mold being separable into four components along a first plane of separation which bisects said first plurality of endless passages and along a second plane of separation which is transverse to said first plane and bisects said second plurality of endless passages whereby each component has two surfaces for engaging two other components with a portion of said passages in each of said surfaces, a support platform adapted for attachment to one of the sections of a press in a molding machine, a first of said components being immovably disposed on said platform, a second of said components being slidably supported on said support platform for movement toward and away from said first component along a first line which is transverse to said first and second planes and to the line along which the sections of the press move relative to one another, a third of said components being slidably supported on said support platform for movement toward and away from said first component generally along said first line, said second and third components being slidably connected to said support platform by male and female portions with said male portions retained in and slidable along said female portions, the fourth component being adapted for attachment to the other of said sections of a press in a molding machine, and means coacting between said fourth component and said second and third components for moving said second and third components generally along said first line as said first and fourth components are moved toward and away from ane another by the sections of a press in a molding machine whereby upon operation of the apparatus in a molding machine said first and fourth mold sections are immovable relative to the sections of the press to which attached and only the second and third components move relative to the sections of the press.

2. An apparatus as set forth in claim 1 including biasing means urging said second and third components to move away from said first component.

3. An apparatus as set forth in claim 1 wherein said last mentioned means includes guide members extending from said fourth component, at least one such guide member being spaced and parallel to one of said planes and at least one such guide member being spaced and parallel to the other of said planes, and guide passages extending through said second and third components respectively for receiving said guide members, said guide passages in said second component being disposed at an angle of 90 degrees relative to said guide passages in said third component, each of said guide passages being disposed parallel to at least one of said planes, so that upon relative movement toward one another between said first and fourth components said guide members move into said guide passages to move said second and third components toward one another and toward said first component and so that upon relative movement away from one another between said first and fourth components said guide members move out of said guide passages.

4. An apparatus as set forth in claim 3 wherein said means includes alignment means for slidably interconnecting said support platform and said fourth component to guide the relative movement therebetween.

5. An apparatus as set forth in claim 3 wherein said male and female portions include tongue and groove means slidably interconnecting said support platform and said second and third components.

6. An apparatus as set forth in claim 5 including stop means disposed on said support platform for limiting movement of said second and third components in a direction away from said first component.

7. An apparatus as set forth in claim 6 including locking members extending from said fourth component for engaging recesses in said second and third components.

8. An apparatus as set forth in claim 7 wherein said second and third components have holes therethrough and said alignment means comprises pins which extend through said holes and slidably engage holes in said support platform.

9. An apparatus as set forth in claim 1 wherein said first plane of separation is disposed at a right angle to said second plane of separation and the line along which said first and fourth components are moved by the press sections is disposed at a right angle to said first line and at an angle of 45 degrees from said planes of separation.

References Cited

UNITED STATES PATENTS

| | | | |
|---|---|---|---|
| 923,521 | 6/1909 | Herron | 249—57 |
| 2,783,502 | 3/1957 | Abplanalp | 249—63 |
| 3,049,759 | 8/1962 | Eberhardt. | |
| 3,333,299 | 8/1967 | Florjancic. | |

WILBUR L. McBAY, Primary Examiner

U.S. Cl. X.R.

249—57